United States Patent [19]
Viviano

[11] Patent Number: 5,701,236
[45] Date of Patent: Dec. 23, 1997

[54] RAILING SYSTEM

[76] Inventor: Robert P. Viviano, 50 Bellview Cir., Robinson Township, Pa. 15136

[21] Appl. No.: 559,831

[22] Filed: Nov. 20, 1995

[51] Int. Cl.$^6$ ..................................................... F21S 5/00
[52] U.S. Cl. ..................... 362/152; 362/32; 362/146; 256/1; 256/65
[58] Field of Search ..................... 256/1, 10, 59, 256/65, 68, 69; 362/32, 145, 146, 151, 152

[56] References Cited

U.S. PATENT DOCUMENTS

| | | | |
|---|---|---|---|
| 2,479,500 | 8/1949 | Longberg | 362/146 |
| 2,654,579 | 10/1953 | Cremens | 256/65 |
| 2,721,255 | 10/1955 | Lanmon | 362/146 |
| 2,873,094 | 2/1959 | Blum | 256/31 |
| 3,395,489 | 8/1968 | Banse | 49/381 |
| 3,454,262 | 7/1969 | Romano | 256/19 |
| 3,652,060 | 3/1972 | Glover | 256/19 |
| 3,698,692 | 10/1972 | Burrows, Jr. | 256/19 |
| 3,991,982 | 11/1976 | Yamamoto | 256/65 |
| 4,214,734 | 7/1980 | Stafford | 256/24 |
| 4,394,714 | 7/1983 | Rote | 362/32 |
| 4,451,025 | 5/1984 | Spera | 256/65 |
| 4,461,461 | 7/1984 | Caron | 256/59 |
| 5,100,107 | 3/1992 | Latta | 256/19 |
| 5,192,056 | 3/1993 | Espinueva | 256/65 |

*Primary Examiner*—Alan Cariaso
*Attorney, Agent, or Firm*—Carothers & Carothers

[57] ABSTRACT

An easily assembled pre-milled railing system having upper and lower rails supported between spaced newel posts and a plurality of balusters disposed between the upper and lower rails. The balusters have upper and lower ends with respective parallel aligned spline grooves that continuously extend across the balusters ends. The upper rail is provided with a continuous elongated spline groove extending along the bottom side thereof. The lower rail is provided with a continuous upwardly projecting spline tongue that extends therealong on the top side and penetrates the lower end spline grooves of the balusters. An elongated spline has an upper side continuously received in the upper rail spline groove and the lower side of the spline is received in the upper end spline grooves of the spaced balusters. The elongated spline is first secured to the upper end of the balusters by nailing downwardly through the spline into the upper ends of the balusters. This spline is then secured to the upper rail in the spline groove by screws which penetrate upwardly through the spline into the upper rail. The railing is uniquely illuminated with an optical light transmission rod that is illuminated from a lamp mounted within an accessible compartment within at least one of the newel posts.

12 Claims, 3 Drawing Sheets

RAILING SYSTEM

FIELD OF THE INVENTION

This invention relates to railing or hand rail systems, and more particularly to a pre-milled railing for exterior decks and porches.

BACKGROUND OF THE INVENTION

The pre-milled railing systems of the prior art which are available for exterior use are labor intensive and too complex for the nonprofessional to install. Traditional railing parts can be purchased on the market, but the labor and material costs prohibit the average purchaser from installing such a railing.

It is a principal object of the present invention to provide a railing that is premilled to allow quick, accurate and easy assembly and construction, and which results in a traditional hand railing construction that is easy to install for either the amateur or professional.

An additional object of the present invention is to provide such a railing system which incorporates a unique and easily assembled light illumination system.

SUMMARY OF THE INVENTION

The railing system of the present invention incorporates an upper rail and a lower rail supported between spaced newel posts with a plurality of balusters disposed between the upper and lower rails. Upper and lower ends of the balusters are provided with respective parallel aligned spline grooves continuously extending across the baluster ends. The upper rail is provided with a continuous elongated spline groove extending along the bottom side thereof and the lower rail is provided with a continuous upwardly projecting spline tongue extending therealong on the top side which penetrates the lower end spline grooves of these spaced balusters.

An elongated spline is also provided. The upper side of this spline is continuously received in the aforedescribed upper rail spline groove provided on the bottom side of the upper rail. The lower side of this elongated spline is received in the upper end spline grooves of the spaced balusters.

Fasteners, such as nails or screws, (preferably galvanized to prevent rust) downwardly penetrate the elongated spline for securing the spline to the upper ends of the balusters. Then fasteners upwardly penetrate this elongated spline from the lower side thereof and secure the spline in the spline groove on the bottom side of the upper rail.

The newel post has cylindrical bases which are smaller in diameter than portions of the newel post situated immediately above their cylindrical bases. This provides a support shoulder between the base and the upper portions of the newel post. The deck upon which the railing system is to be mounted is provided with corresponding round openings therethrough which respectively receive the round bases in the openings with near engagement so that the shoulders rest on the deck supporting the newel post in an upright position. This permits the newel posts to be easily installed no matter what angle the railings are secured to the newel posts. Once the newel posts are properly positioned in and on the deck, they may then be readily secured to the deck support with conventional deck screws or lag bolts.

A unique light illumination system is also provided for the railing system of the present invention wherein an electric light is housed in an accessible compartment within at least one of the newel posts. An elongated optical light transmission media or member, such as a acrylic plastic light transmission rod is secured to one of the rails and the light receiving end of this light transmission rod is exposed to this light within the newel post for illumination of the rod, thereby providing aesthetic deck light illumination.

The use of a unique adapter for the railing system of the present invention is preferred in order to accommodate this elongated optical light transmission media. An elongated spacer strip is adapted for coextending with the upper rail and the spacer is provided with a continuous top side spline tongue that is received in the upper rail spline groove, instead of the aforesaid elongated spline. The spacer is also provided with a continuous bottom side spline groove that receives the elongated spline as aforedescribed before securement with the upper ends of the balusters. A longitudinal elongated groove is provided in a side face of this spacer which receives and retains the light transmission media or rod therein.

This elongated side face groove in the spacer has a bottom and opposing sides and a kerf compression slot is provided in and coextends in the bottom of this groove. Screws are then provided which upwardly penetrate through this kerf slot and thereby compress the opposing sides of this groove together to clamp the elongated optical light transmission media or rod therebetween in the groove and accordingly hold and maintain it in permanent mounted position with a side of the light transmission rod exposed for illumination of the deck.

These screws which upwardly penetrate the spacer to clamp the light transmission rod within the side groove also further penetrate the upper rail to secure the upper rail and spacer together with no exposed fasteners.

A wire transmission passage groove may also be provided in the upper side of this spacer adjacent the spacer spline tongue. This groove coextends with the entire length of the spacer to provide an electrical wire passage to receive wires between spaced newel posts and to connect the light within the newel post compartment for energization from a remote electrical source.

A vertical extending passage is also preferably provided in the newel post and communicates with the light compartment for receiving electrical wires for energizing the light within the newel post compartment from a remote electrical source.

This new railing system is designed to fit together in a fashion similar to mortise and tenon or tongue and groove applications. The balusters are notched on both ends to fit into the tongue of the bottom and top rails. The upwardly extending spline tongue on the bottom rail, which receives the bottom end of the balusters, also permits a quick and easy drain off of water so that water cannot collect and rot the wood structure, as is the case with many conventional railing systems.

While the present invention is directed toward a wooden railing system, it could also be constructed of a suitable plastic material.

This tongue and groove assembly allows for quick and easy alignment, and centering of the balusters on both rails as well as providing strength in the joints.

The balusters have unlimited adjustment for spacing between balusters. This arrangement also permits the nonprofessional to hold the balusters in place before and while fastening.

The elongated spline is first fastened to the balusters from the top of the elongated spline and then the spline is inserted in the bottom groove of the top rail and the elongated spline is then fastened from the undersign to the top rail with screws. This prevents the exposure of the nails and screws on the top rail.

Also, the rail structure of the present invention prevents the tendency for wood to twist and turn and thereby possibly causing the fasteners to protrude from their securement surfaces to thereby cause possible injury.

The round bottom or bases of the newel posts permits the builder to simply drill a hole in the porch or deck and make a perfect fit for the newel posts which adds considerable strength to the railing structure. The newel posts as installed can then be shimmed against the outside ring board of the deck or porch for true plum at the time of installation and then secured with appropriate deck screws or lag bolts. Also, this round base for the newel posts permits the rotation of the posts to enable any angle desired between incoming rails.

The design of the railing system of the present invention provides a railing which has added natural strength in construction around the pre-milled joints and does not over rely on the use of fasteners for strength, as is the case with many of the prior art railing systems. The railing system of the present invention also permits ease and ability to interchange, replace or to stain parts.

BRIEF DESCRIPTION OF THE DRAWINGS

Other objects and advantages appear hereinafter in the following description and claims.

The accompanying drawings show, for the purpose of exemplification, without limiting the invention or claims, certain practical embodiments of the present invention wherein:

DETAILED DESCRIPTION OF THE DRAWINGS

Figures 1, 2:
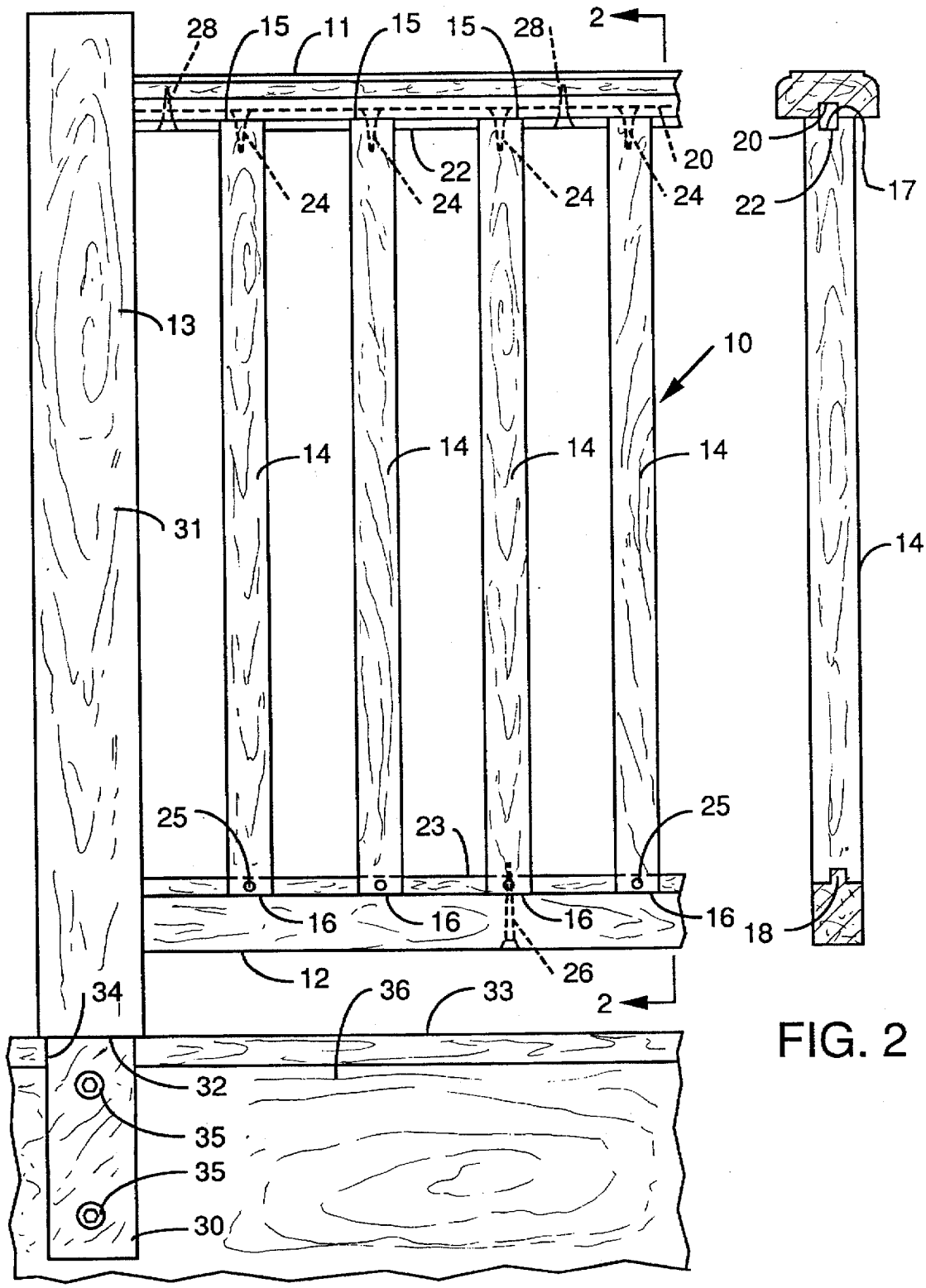
FIG. 1 is a view in side elevation of one embodiment of the railing system of the present invention.
FIG. 2 is an end view in vertical cross section of the railing shown in FIG. 1 as seen along section line 2—2.

Referring to FIGS. 1 and 2, the railing system 10 of the present invention as illustrated has an upper rail 11 and a lower rail 12 which are supported between spaced newel posts 13 (only one being shown). A plurality of balusters 14 are disposed between upper rail 11 and lower rail 12. Spaced balusters 14 have upper ends 15 and lower ends 16 with respective parallel aligned spline grooves 17 and 18 continuously extending across the upper and lower ends 15 and 16.

Upper rail 11 is provided with a continuous elongated spline groove 20 extending along the bottom side thereof. An elongated spline 22 has the upper side thereof continuously received in this upper spline groove 20 and the lower side of spline 20 is received in the spaced upper end spline grooves 17 of balusters 14. Lower rail 12 is provided with a continuous upwardly projecting spline tongue 23.

Fasteners in the form of galvanized finishing nails or screws 24 (screws shown) downwardly penetrate the elongated spline 22 and the upper ends 15 of balusters 14 for securing the balusters 14 in position between the upper and lower rails 11 and 12.

Additional finishing nails 25 or upwardly penetrating galvanized screws 26 may be utilized to secure the bottom end 16 of balusters 14 to bottom rail 12.

After spline 22 has been connected to the upper ends 15 of balusters 14, then the upper side of elongated spline 22 is positioned into spline groove 20 of upper rail 11 and secured there from the lower side by galvanized screws 28.

Spaced newel posts 13 (only one being illustrated in the figure for simplification) have cylindrical or turned bases 30 which are smaller in diameter than the rectangular or square cross-section upper portions 31 of newel post 13, thereby providing a support shoulder 32 therebetween and ability to rotate to any angle. Wood deck 33 is provided with corresponding round openings 34 therethrough for respectively receiving the bases 30 of newel post 13 in openings 34 with near engagement such that shoulders 32 rest on top of deck 33 for supporting newel post 13 in an upright position as illustrated. Once newel posts 13 are properly positioned by rotating the base 30, it is then bolted with bolts 35 to skirt or joist 36 of deck 33.

Figure 3:
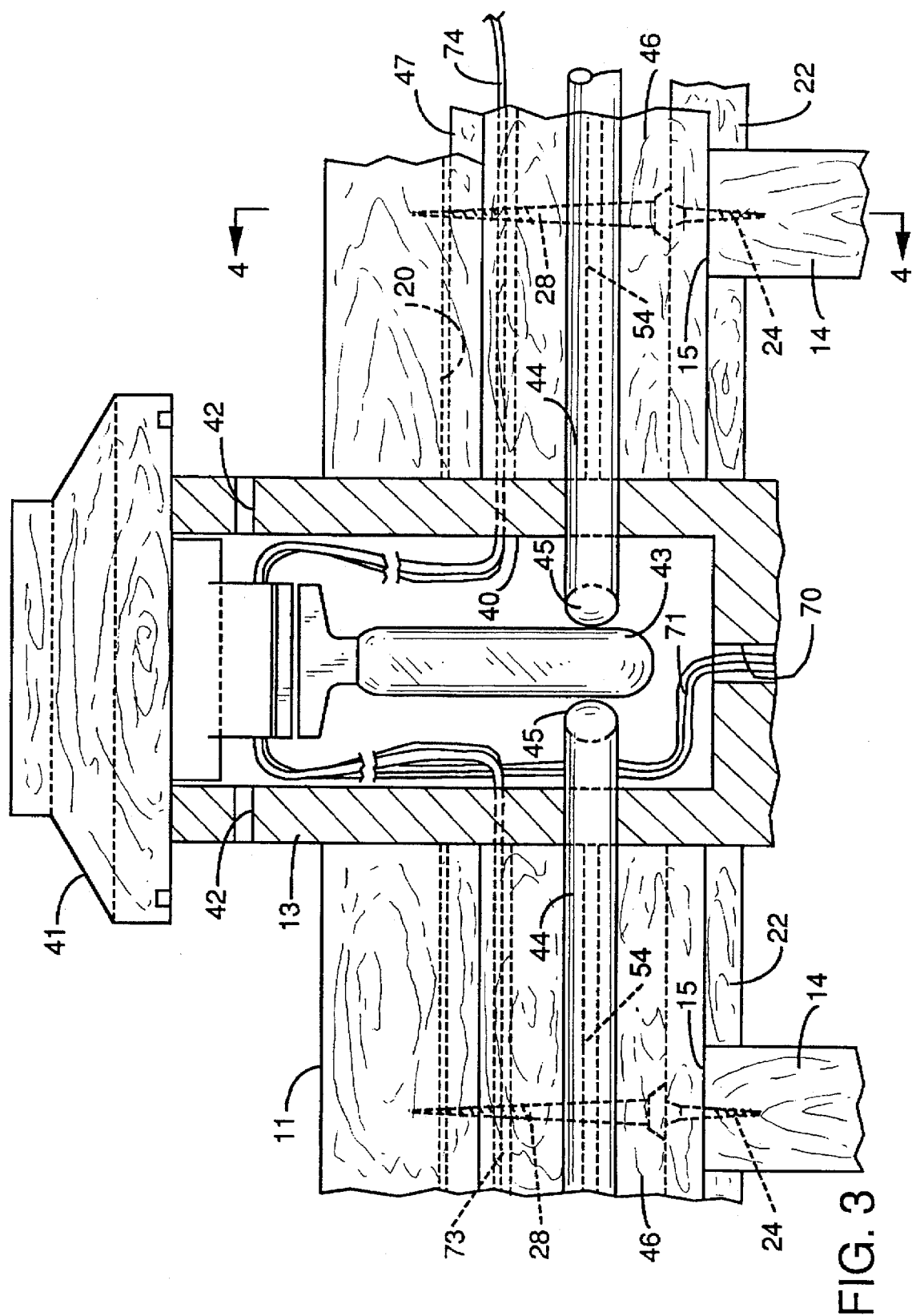
FIG. 3 is a view in side elevation of another embodiment of the railing system of the present invention illustrating modifications to the upper railing and newel post portions of the railing system shown in FIG. 1 with the unique light illumination system of the present invention in place and with portions shown in cross-section to reveal internal detail.
Figure 4:
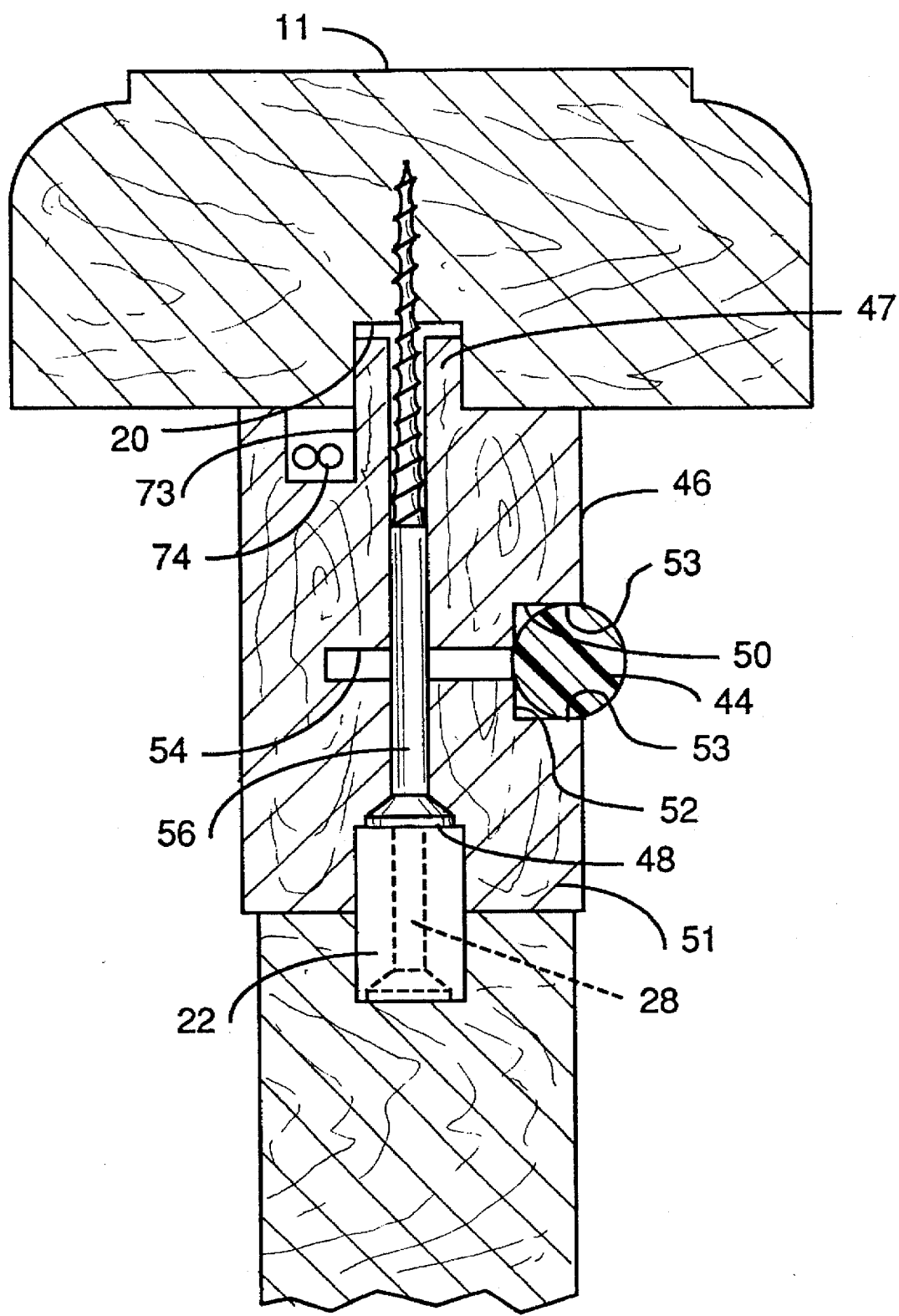
FIG. 4 is an end view in vertical cross section of the illuminated railing system shown in FIG. 3 as seen along section line 4—4.

Turning next to FIGS. 3 and 4, basically the same railing system is illustrated and therefore the same reference numerals are utilized for designating the same parts. Additional reference numerals are used to indicate added parts for the illumination system used for illuminating the railing system of the present invention.

In FIG. 3, newel post 13 is provided with an accessible compartment 40 which is bored therein and capped off with newel cap 41. Vent holes 42 are provided in the upper end of compartment 40 to provide adequate ventilation.

A low heat electric lamp and fixture 43 is mounted to top cap 41. Top cap 41 is removable therefore allowing access to bulb change in compartment 40.

A light transmission media in the form of acrylic light transmission rod 44 is secured to the upper rails 11 with the light receiving ends 45 thereof exposed to light 43 for illumination of the transmission rods 44.

A spacer strip 46 coextends with upper rails 11 and is provided with a continuous top side spline tongue 47 received in upper rail spline groove 20. Spacer 46 also has a continuous bottom side spline groove 48 receiving the upper side of elongated spline 22. A longitudinal elongated groove 50 is provided in side face 51 of spacer 46 for receiving and retaining light transmission rod 44 therein.

Side face groove 50 has a bottom 52 and opposing sides 53. A kerf compression slot 54 coextends along and in the bottom 52 of groove 50. Screws 56 upwardly penetrate spacers 46 through kerf slot 54 and thereby not only retain spacer 46 to upper rail 11, but additionally compress opposing sides 53 of slot 50 together to clamp elongated optical light transmission rod 44 between sides 53 of groove 50.

Finishing nails or screws 24 secure spline 22 to the upper ends 15 of balusters 14 and screws 28 penetrate elongated spline 22 and secure the same to upper rail 11 within underside spline groove 20.

A vertically extending passage 70 is provided in newel post 13 and communicates compartment 40 with the bottom exterior of newel post 13 for receiving electrical wires 71 therein for energizing light 43 from a remote electrical source (not shown).

Wire transmission passage groove 73 also coextends in the upper side of spacer 46 adjacent to spacer spline tongue 47 and electrical wires 74 pass through groove 73 to feed electrical power to lamps 43 in adjacent spaced newel post compartments 40.

I claim:

1. A railing system comprising: an upper rail and a lower rail each with top and bottom sides and supported between spaced newel posts, a plurality of balusters disposed between the upper rail and the lower rail, said balusters having upper ends and lower ends with respective parallel aligned spline grooves continuously extending across said ends, said upper rail having a continuous elongated spline groove extending along the bottom side thereof, said lower rail having a continuous upwardly projecting spline tongue extending therealong on the top side thereof and penetrating said lower end spline grooves of said balusters, and an elongated spline having an upper side and a lower side with the upper side thereof continuously received in said upper rail spline groove, the lower side of said spline received in said upper end spline grooves of said balusters, fastener means respectively downwardly penetrating said elongated spline and said upper ends of said balusters for securing said balusters in position between said upper and lower rails, and fastener means upwardly penetrating said elongated spline from the lower side thereof and thereby securing said spline in said spline groove to the bottom side of said upper rail.

2. The railing system of claim 1 wherein said newel posts have cylindrical bases which are smaller in diameter than portions of said newel posts situated immediately above said cylindrical bases thereby providing a support shoulder therebetween, a deck having corresponding round openings therethrough respectively receiving said bases in said openings with near engagement with said shoulders resting on said deck for supporting said newel posts in an upright position.

3. The railing system of claim 1, including electric light means housed in an accessible compartment within at least one of said newel posts, and elongated optical light transmission means having a light receiving end, said light transmission means secured to one of said rails and the light receiving end thereof exposed to said light means for illumination of said light transmission means.

4. The railing system of claim 3, including an elongated spacer strip adapted for coextending with said upper rail and having a continuous top side spline tongue received in said upper rail spline groove and having a continuous bottom side spline groove receiving the upper side of said elongated spline, and a longitudinal elongated groove in a side face of said spacer receiving and retaining said light transmission means.

5. The railing system of claim 4, said elongated side face groove having a bottom and opposing sides and including a kerf compression slot coextending in the bottom of said groove, and screw means penetrating through said kerf slot and thereby compressing said opposing sides together to clamp said elongated optical light transmission means therebetween.

6. The railing system of claim 5, wherein said screw means upwardly penetrates said spacer from within said spacer bottom side spline groove and thereby securing said upper rail and said spacer together with said light transmission means retained under compression in said side face groove.

7. The railing system of claim 6, including fastener means respectively downwardly penetrating said elongated spline and said upper ends of said balusters for securing said balusters in position between said spacer and lower rail.

8. The railing system of claim 7, including a wire transmission passage groove coextending in the upper side of said spacer adjacent said spacer spline tongue, and electrical wire means passing through said wire transmission passage groove and connected to said light means for energization thereof from a remote electrical source.

9. The railing system of claim 3, including a vertically extending passage in said at least one of said newel posts and communicating with said compartment for receiving electrical wires therein for energizing said light means from a remote electrical source.

10. A combination railing and illumination system comprising: a railing including upper and lower rails supported between spaced newel posts and a plurality of balusters disposed between said upper and lower rails, light means mounted in an accessible compartment in one of said newel posts, an elongated optical light transmission means having a light receiving end, said light transmission means secured to one of said rails and the light receiving end thereof exposed to said light means for illumination of said light transmission means, said elongated optical light transmission means received in an elongated groove in one of said rails, said elongated groove having a bottom and opposing sides and including a kerf compression slot coextending in the bottom of said groove, and screw means penetrating through said kerf slot and thereby compressing said opposing sides together to clamp said elongated optical light transmission means therebetween.

11. The combination railing and illumination system of claim 10, including a wire transmission passage in said one of said newel posts communicating said compartment with a bottom exterior portion of said one newel post, and electrical wire means passing through said passage and connected to said light means for energization thereof from a remote electrical source.

12. The combination railing and illumination system of claim 10, including a wire transmission passage through and coextending with said one of said rails, and electrical wire means passing through said rail passage and connected to said light means for energization thereof from a remote electrical source.

* * * * *